(12) United States Patent
Sano

(10) Patent No.: US 7,674,423 B2
(45) Date of Patent: *Mar. 9, 2010

(54) PROCESS FOR PRODUCING THREE-DIMENSIONAL MODEL

(75) Inventor: Shojiro Sano, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 641 days.

This patent is subject to a terminal disclaimer.

(21) Appl. No.: 10/840,634

(22) Filed: May 7, 2004

(65) Prior Publication Data

US 2004/0222548 A1 Nov. 11, 2004

(30) Foreign Application Priority Data

| May 9, 2003 | (JP) | ............................. 2003-131619 |
| May 12, 2003 | (JP) | ............................. 2003-132922 |
| Sep. 1, 2003 | (JP) | ............................. 2003-308425 |

(51) Int. Cl.
   B29C 35/08   (2006.01)
   B29C 41/02   (2006.01)
(52) U.S. Cl. ...................................... 264/463; 264/113
(58) Field of Classification Search ................. 264/308, 264/109, 463, 113
   See application file for complete search history.

(56) References Cited

U.S. PATENT DOCUMENTS

| 5,204,055 | A | | 4/1993 | Sachs et al. |
| 5,387,380 | A | | 2/1995 | Cima et al. |
| 6,007,318 | A | * | 12/1999 | Russell et al. ............... 425/130 |
| 6,117,612 | A | * | 9/2000 | Halloran et al. ............. 430/269 |
| 6,322,728 | B1 | * | 11/2001 | Brodkin et al. ............... 264/19 |
| 6,583,930 | B1 | * | 6/2003 | Schrenk et al. ............. 359/495 |
| 6,799,959 | B1 | | 10/2004 | Tochimoto et al. |
| 6,808,659 | B2 | * | 10/2004 | Schulman et al. ............. 264/16 |
| 7,300,613 | B2 | * | 11/2007 | Sano et al. ................... 264/113 |
| 7,365,129 | B2 | * | 4/2008 | Kramer et al. ............... 525/191 |
| 2003/0164567 | A1 | * | 9/2003 | Coe .......................... 264/40.1 |
| 2004/0012112 | A1 | * | 1/2004 | Davidson et al. ........... 264/109 |
| 2004/0036200 | A1 | * | 2/2004 | Patel et al. .................. 264/401 |

(Continued)

FOREIGN PATENT DOCUMENTS

EP            0 403 758      12/1990

(Continued)

OTHER PUBLICATIONS

Japanese Office Action dated Dec. 13, 2007.

(Continued)

*Primary Examiner*—Leo B Tentoni
(74) *Attorney, Agent, or Firm*—Sughrue Mion, PLLC

(57) ABSTRACT

A process for producing a three-dimensional model is provided. The process includes (a) a layer formation step of forming a layer of a powder material having a refractive index $n_1$ above a support, (b) a shape formation step of bonding the powder material layer into a predetermined shape by a binder that gives a refractive index $n_2$, and (c) sequentially repeating the above steps. The absolute value of the difference between the refractive index $n_1$ of the powder material and the refractive index $n_2$ given by the binder is 0.1 or less, and the binder includes two or more types of binders selected from the group consisting of at least one type of colored binder, a white binder, and a colorless transparent binder.

8 Claims, 2 Drawing Sheets

U.S. PATENT DOCUMENTS

| | | | |
|---|---|---|---|
| 2004/0135276 A1* | 7/2004 | Nielsen et al. | 264/40.1 |
| 2004/0188887 A1* | 9/2004 | Kasai et al. | 264/463 |
| 2004/0219112 A1* | 11/2004 | Oniki et al. | 424/53 |
| 2005/0064339 A1* | 3/2005 | Miyoshi | 430/300 |
| 2005/0234231 A1* | 10/2005 | Hashimoto et al. | 536/58 |
| 2006/0097224 A1* | 5/2006 | Hanelt et al. | 252/299.01 |

FOREIGN PATENT DOCUMENTS

| | | |
|---|---|---|
| JP | 05-286040 A | 11/1993 |
| JP | 11-100305 A | 4/1999 |
| JP | 2001-150556 | 6/2001 |
| JP | 2001-150556 A | 6/2001 |
| JP | 2002-292749 A | 10/2002 |
| JP | 2002-307562 A | 10/2002 |
| WO | WO 98/09798 A1 | 3/1998 |

OTHER PUBLICATIONS

European Search Report dated Nov. 5, 2008.

* cited by examiner

PROCESS FOR PRODUCING THREE-DIMENSIONAL MODEL

BACKGROUND OF THE INVENTION

1. Field of the Invention

The present invention relates to a three-dimensional modeling technique and, in particular, a process for producing a three-dimensional model involving adding a binder so as to bond a powder.

2. Description of the Related Art

There is a conventionally known technique to form a model, which is a three-dimensional model of a solid modeled object, by bonding with a binder a thin powder layer for each of a plurality of parallel cross sections of the modeled object, and sequentially layering these bonded thin layers.

Such a technique can be utilized in applications such as component prototyping, which is known as rapid prototyping, and design verification. Recently, a system employing an inkjet method, which is inexpensive, fast, and suitable for the formation of a color model, has been proposed and disclosed in, for example, Japanese registered patent No. 2729110. A specific procedure for this three-dimensional modeling is explained below.

Firstly, a thin layer of a powder is uniformly spread on a flat surface by means of a blade mechanism, and an inkjet nozzle head is made to scan and discharge a binder in a predetermined region of the thin powder layer. The powder material in the region where the binder has been discharged is subjected to an operation necessary to put it into a bonded state and also to bond it to a lower layer that has already been formed. These steps of sequentially forming a powder layer at the top and discharging the binder are repeated until the whole model is completed. Finally, powder in a region to which no binder has been applied can be removed easily when taking out the model from the equipment and the model can be separated because the powder particles are separate and not bonded to each other. In accordance with the above-mentioned operations, a desired three-dimensional model can be produced.

Furthermore, a production process employing a similar method, in which binders are colored with yellow (Y), magenta (M), and cyan (C), thus giving coloration and also improving the bonding strength, has been disclosed in, for example, JP-A-2001-150556 (JP-A denotes a Japanese unexamined patent application publication).

However, in the present situation the above-mentioned method cannot achieve a satisfactory level of properties (texture, color) for a model when compared with that which is desired. In particular, it is thought that a three-dimensional model for which transparency is required cannot be obtained by the conventional method because of the difference in properties between the powder and the binder and the presence of voids formed due to the powder. Furthermore, in order to impart smoothness to the surface, it is necessary to carry out overcoating and polishing manually, which requires the time and expense.

Moreover, it is generally difficult to reliably draw a desired pattern, etc. on a predetermined position of a three-dimensional model by hand painting.

Since a three-dimensional model immediately after forming is shaped only by virtue of the bonding force of the binder, the three-dimensional model has a low strength and, depending on the way it is handled, might be broken. Conventionally, therefore, after forming the three-dimensional model it is impregnated with a resin, a wax, etc. between the powder particles in order to increase the strength. However, such a step requires time and effort.

BRIEF SUMMARY OF THE INVENTION

The present invention has been accomplished in view of the above-mentioned problems, and it is an object of the present invention to provide a three-dimensional modeling technique that enables production of a three-dimensional model that faithfully represents not only shape but also color. In particular, the object is to produce a three-dimensional model having a colored appearance in a short period of time at low cost.

The object of the present invention can be achieved by a process for producing a three-dimensional model, the process comprising (a) a layer formation step of forming a layer of a powder material having a refractive index $n_1$ above a support, (b) a shape formation step of bonding the powder material layer into a predetermined shape by a binder that gives a refractive index $n_2$, and (c) sequentially repeating the above steps, the absolute value of the difference between the refractive index $n_1$ of the powder material and the refractive index $n_2$ given by the binder being 0.1 or less, and the binder comprising two or more types of binders selected from the group consisting of at least one type of colored binder, a white binder, and a colorless transparent binder.

DETAILED DESCRIPTION OF THE INVENTION

The above-mentioned production process is explained in detail below.

The present invention relates to a process for producing a three-dimensional model, the process comprising sequentially repeating a step of forming a layer, which preferably has a predetermined thickness, of a powder material having a refractive index $n_1$ above a support, and a step of bonding the powder material layer formed by the above-mentioned step so as to have a predetermined shape by means of a binder having a refractive index $n_2$ (here, $-0.1 \leq (n_1-n_2) \leq 0.1$).

In the explanation below, the expression 'cured binder' or simply 'binder' is used for a bonding agent that is formed by curing an actinic radiation-reactive binder by the application of actinic radiation, and a person skilled in the art will understand whether it means the binder before curing or the binder after curing. It should be noted that when the binder is reactive as described above and the binder after reaction bonds the powder material together so as to form a three-dimensional model, the cured binder has a refractive index of $n_2$.

The powder material can be an organic material, an inorganic material, or an inorganic/organic composite material. Details thereof will be explained later.

As the support, a support having any surface profile can be used, but a support having a smooth surface is preferable, and a support having a flat surface can be used preferably. It is preferable to use a support having on its perimeter a frame that can be extended to a height greater than that of the three-dimensional model that is to be produced.

With regard to the predetermined thickness for the powder material layer, it is preferably a layer having a thickness of 10 to 500 μm per slice pitch, and more preferably 50 to 150 μm. Each time a layer formation step and a cross-sectional shape formation step are repeated, the overall thickness of the stack of powder material layers increases by the above-mentioned slice pitch.

The cross-sectional shape referred to here means a shape corresponding to one of a plurality of parallel cross sections of a modeled object, and when it is accompanied by coloring, it means the shape and the accompanying color. In particular, the cross-sectional shape of an opaque model can be a hollow shape, and in this case it is sufficient to reproduce the shape in the vicinity of the outline thereof. With regard to coloration, color may be reproduced on the surface alone of the model, and color reproduction of the outer surface of the shape is important.

A summary of the process for producing a three-dimensional model of the present invention is explained with reference to drawings.

Figure 1:
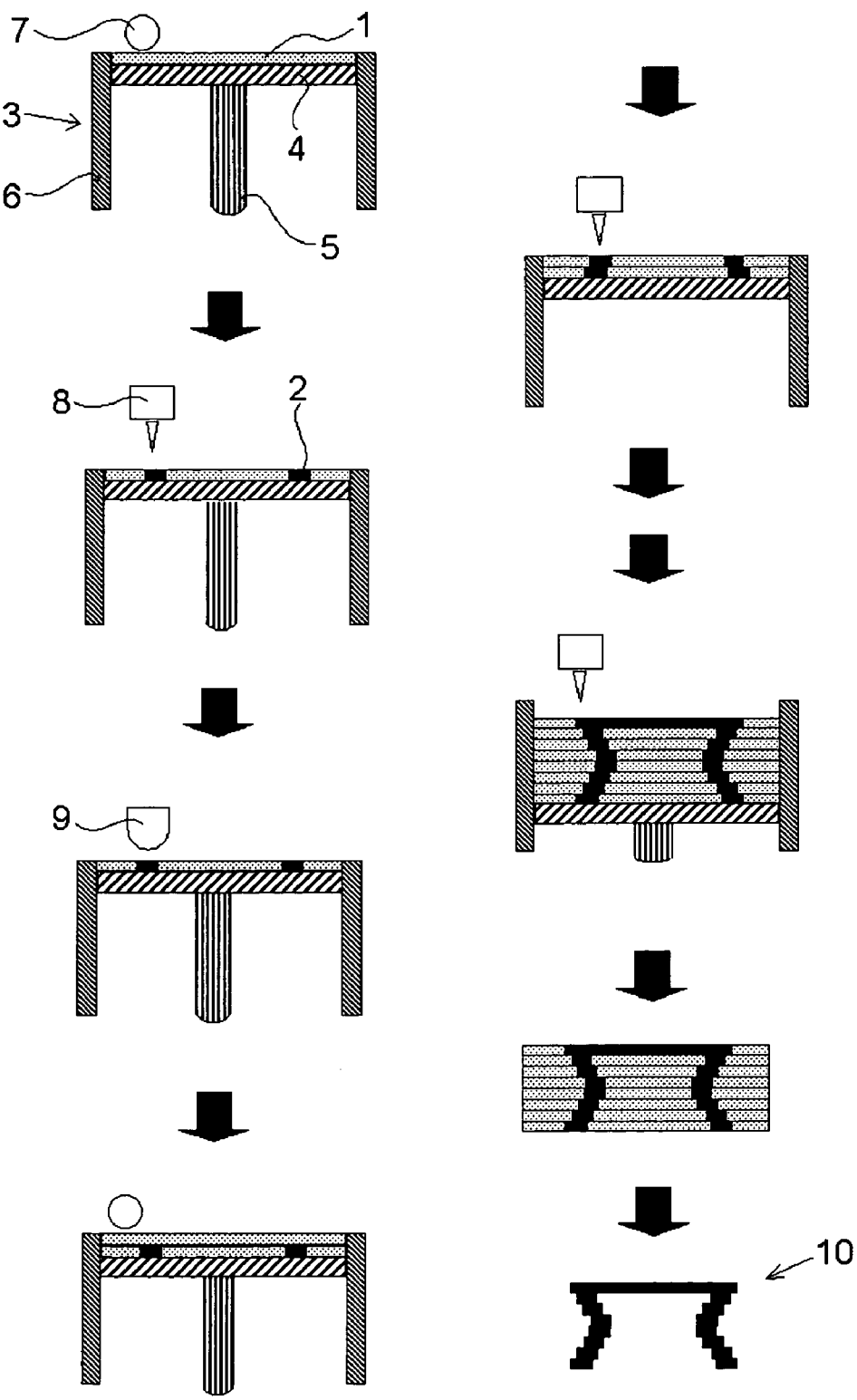
FIG. 1 is a schematic view showing each step of one embodiment of the process for producing a three-dimensional model of the present invention.

FIG. 1 is a schematic view showing the main steps of one embodiment of the process for producing a three-dimensional model of the present invention.

In the production process of the present invention, a thin layer 1 of a powder material is formed above a support (modeling stage) 4 provided in a three-dimensional modeling section 3. The support 4 is supported by a vertically moving section 5 and its perimeter is surrounded by a frame 6. The thin layer 1 is formed by moving surplus powder material, which is supplied from a powder supply section to the support 4, in a direction X (the left-to-right direction in the plane of the paper) by means of a blade 7 that extends lengthwise in a direction Y (a direction perpendicular to the plane of the paper). A binder is supplied to the top of the thus-formed thin layer 1 of the powder material, via an inkjet head 8 of a binder application section, according to cross-sectional shape data so as to form a region 2 to which the binder has been applied. This region 2 to which the binder has been applied is cured by exposure to ultraviolet rays from an ultraviolet irradiation section 9, and a cross-sectional shape is formed by bonding the powder material throughout the thickness of the thin layer in the region 2 to which the binder has been applied, and also by bonding it to the cross-sectional shape that is directly below.

Ultraviolet rays are explained here as a representative example, and it is of course possible to use other actinic radiation. The actinic radiation includes various types of radiation such as an electron beam ($\beta$-rays), ultraviolet rays (UV), X-rays, $\gamma$-rays, and $\alpha$-rays.

Subsequently, the vertically moving section 5 is moved downward by 1 slice pitch, and a new powder material layer is formed.

Binder is supplied to the top of the newly formed thin layer via the inkjet head of the binder application section according to the next adjacent cross-sectional shape data so as to form a new region to which binder has been applied. This region is cured by exposure to ultraviolet rays so as to bond the powder material.

After sequentially repeating formation of the powder material thin layer 1, supply of the binder, and curing a required number of times, a three-dimensional model 10 can be obtained by separating the powder material in the region where no binder has been applied.

Figure 2:
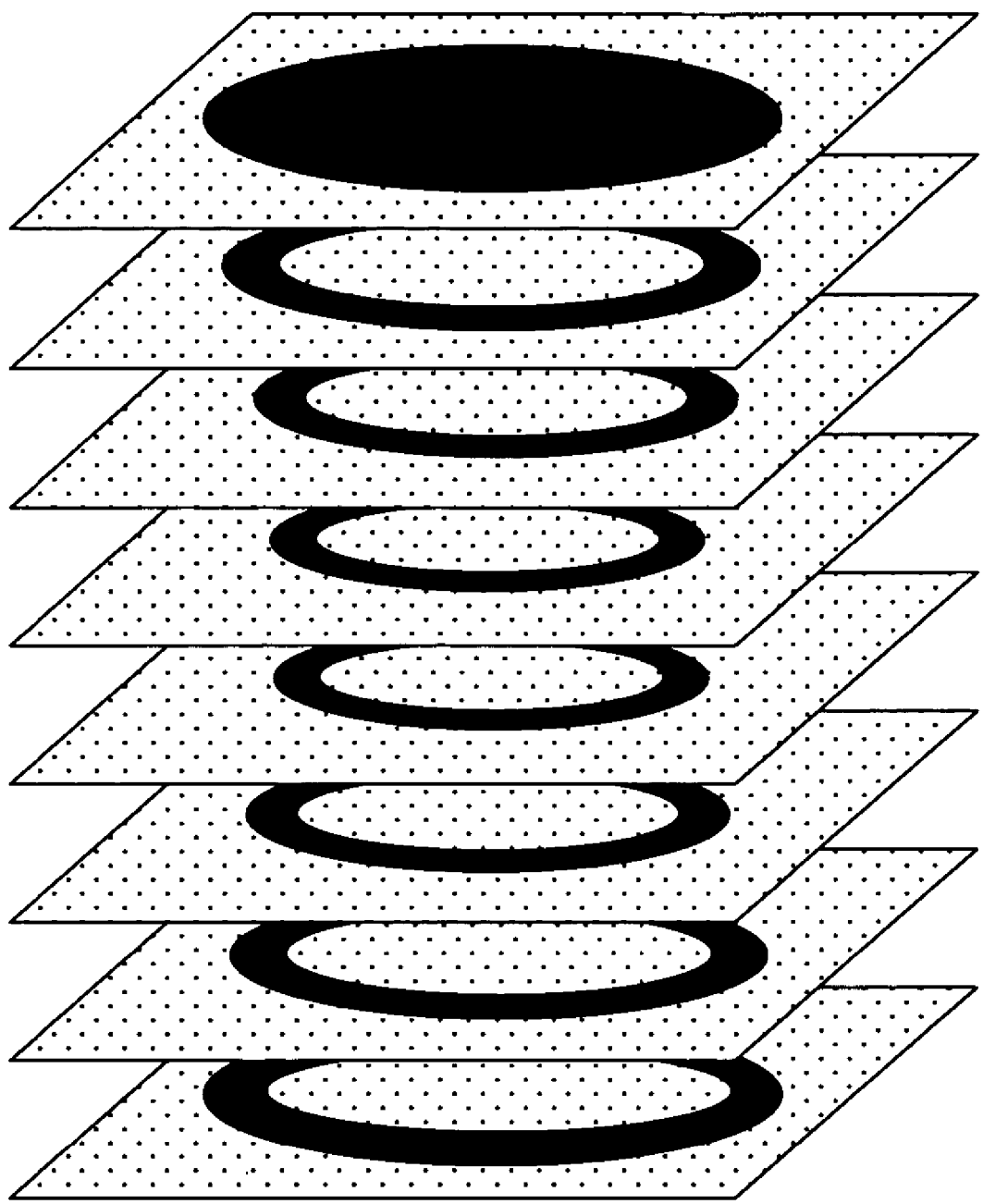
FIG. 2 is a perspective view showing schematically the cross-sectional shape of several layers formed in the production of the three-dimensional model shown in FIG. 1.

FIG. 2 is a perspective view showing schematically the cross-sectional shape formed in each of the adjacent layers in the production of the above-mentioned three-dimensional model.

A preferred embodiment of the process for producing a three-dimensional model of the present invention is explained below. The five steps below include a step of preparing three-dimensional shape color data and a step of preparing colored cross-sectional shape data for each cross section, prior to the powder layer formation step and the cross-sectional shape formation step.

In a first step, model data representing a three-dimensional modeled object having on its surface a color pattern, etc. are created in a computer. As model data used as a basis for modeling, color three-dimensional model data formed by general 3D-CAD modeling software can be used. It is also possible to utilize data and texture of a three-dimensional shape measured using a three-dimensional shape input device.

In a second step, cross-sectional data for each horizontally sliced cross section of the modeled object are formed from the above-mentioned model data. A cross-sectional body sliced at a pitch (layer thickness t) corresponding to the thickness of one layer of the layered powder is cut out of the model data, and shape data and coloration data showing a region where the cross section is present are formed as the cross-sectional data. In the present invention, 'shape data' and 'coloration data' are together also called 'colored (cross sectional) shape data'.

Subsequently, information regarding the layer thickness (slice pitch t when forming the cross sectional data) of the powder and the number of layers (the number of sets of cross-sectional data) when modeling a modeled object is input from the computer into a drive control section of a pattern formation device.

In a third step, supply of a powder material, which is the material for producing the three-dimensional model on the modeling stage, is carried out. The powder material is spread in a flat layer shape using a powder material counter-rotating mechanism (hereinafter, called a 'counter roller'), and supply of the powder material is stopped when a predetermined amount of powder has been supplied.

'Sequentially repeating the layer formation step and the cross-sectional shape formation step' referred to in the present invention means not only (1) carrying out a step of forming a cross-sectional shape on the whole surface of a new layer after completing a new layer formation step, but also (2) forming a cross-sectional shape in a region of a newly formed layer before formation of the newly formed layer is completed, while still carrying out the new layer formation step. An example of the latter case has been disclosed in JP-A-2002-307562.

A fourth step is a step of forming a cross-sectional shape, which is colored if necessary, under the control of the drive control section according to the cross-sectional shape data for the cross section. This step preferably employs a non-contact method. As a representative example, an inkjet method is explained.

The shape data and the coloration data created in the second step are converted into finely divided grids of bitmap information for each color of C, M, and Y, and an inkjet head is moved within the XY plane. During the movement, an actinic radiation-curing binder is discharged appropriately from each inkjet discharge nozzle based on the color data. With regard to the binder, it is preferable to use two or more types of binders selected from the group consisting of at least one type of colored binder, a white binder, and a colorless transparent binder.

With regard to the colored binders, a combination of the three colors of yellow (Y), magenta (M), and cyan (C), which are subtractive primaries, is preferable. In the present invention, a yellow-colored binder is called a 'yellow binder', a magenta-colored binder is called a 'magenta binder', and a cyan-colored binder is called a 'cyan binder'. An M dye and a C dye may each comprise two, that is, dark- and palecolored, types of binders. The colorless binder can be used in order to adjust the CMY color densities. Furthermore, a desired effect can be attained by the combined use of a binder (white binder) containing a white (W) pigment such as titanium white or a binder (black binder) colored with a black (B) dye. In addition, the yellow binder can be a yellow binder composition containing an appropriate additive in addition to a yellow-dye and a reactive binder. The same applies to the M, C, B, and W binders.

The total amount of the colored binder, the colorless binder, and the white binder that is discharged is preferably constant per unit area.

As another example of the step of forming a colored cross-sectional shape, it is possible to employ a two-stage step in which, after a colorless ultraviolet-curing binder alone is discharged into a powder material according to the shape data and cured by ultraviolet irradiation, a normal CMY inkjet containing no binder is discharged on the bonded powder material layer according to the coloration data for the layer.

At the same time as, or after the binder is applied to the powder material layer, the binder thus applied is exposed to ultraviolet rays using an ultraviolet irradiation device, thus forming a powder material bonded body.

UV exposure can be carried out after discharging a UV-curing binder, but also the binder can be discharged on the surface of a powder material that is being exposed to UV.

When the atmosphere for the UV irradiation is an atmosphere of an inert gas such as nitrogen or argon, the effect of oxygen in delaying radical polymerization can be suppressed.

The inkjet system employed here means mainly an on-demand inkjet system, which includes a piezo on-demand inkjet system, a thermal on-demand ink-jet system, and an electrostatic on-demand inkjet system, and the piezo on-demand inkjet system and the electrostatic on-demand inkjet system are preferable in terms of stability of the UV-curing binder.

Furthermore, by repeating the third step and the fourth step, a target three-dimensional model can be obtained.

In a powder material region to which no binder is applied, the powder is maintained in a separated state.

In a fifth step, the powder material in a region to which no bonding agent has been applied is separated, and a bonded powder body (three-dimensional model) bonded by the binder is taken out. The powder material that has not been bonded is recovered and can be reused.

By sequentially repeating the third and fourth steps, a three-dimensional model formed by sequentially layering bonded powder material bodies corresponding to cross sections obtained by sectioning the modeled object in a plurality of planes can thus be produced.

By bonding into a cross-sectional shape a layer of a powder material having a refractive index $n_1$ by means of a binder that gives a refractive index $n_2$ (here, $-0.1 \leq (n_1-n_2) \leq 0.1$), a substantially transparent three-dimensional model can be produced.

Refractive index data required in the present invention are obtained by mixing two types of liquids having known refractive indexes so as to give a liquid having a freely varied refractive index, adding to this liquid a material to be measured, and carrying out measurement at 25° C. using a Model 3 Abbe refractometer manufactured by Atago Co., Ltd.

The three-dimensional model thus obtained can be subjected to a post-treatment step such as cleaning, thermal treatment, resin or wax impregnation, or polishing. Cleaning is carried out by blowing the above-mentioned three-dimensional model and brushing so as to remove any powder remaining in gaps, thus enabling surplus powder to be removed. The thermal treatment increases the strength and the durability of the above-mentioned three-dimensional model. Wax impregnation reduces the voids, imparts water resistance to the above-mentioned three-dimensional model, and makes finishing by polishing easy. Finishing by polishing improves the surface smoothness.

Each component used in the present invention is explained below. Specific details should not be construed as being limited to those in the explanation below.

(Powder Material)

As the powder material, any of an inorganic powder, an organic powder, and an inorganic/organic composite powder can be used.

In general, the powder material has an average particle size of 0.1 to 1,000 µm, preferably 0.5 to 500 µm, more preferably 1 to 300 µm, and yet more preferably 1 to 50 µm. The shape of the powder material can be any of amorphous, spherical, tabular, acicular, porous, etc. forms.

Examples of the inorganic powder include metals, and metal oxides, composite oxides, hydroxides, carbonates, sulfates, silicates, phosphates, nitrides, carbides, sulfides, and composites of at least two types thereof. Specific examples thereof include magnesium hydroxide, silica gel, aluminum hydroxide, alumina, glass, titanium oxide, zinc oxide, zirconium oxide, tin oxide, potassium titanate, aluminum borate, magnesium oxide, magnesium borate, calcium hydroxide, basic magnesium sulfate, calcium carbonate, magnesium carbonate, calcium sulfate, magnesium sulfate, calcium silicate, magnesium silicate, calcium phosphate, silicon nitride, titanium nitride, aluminum nitride, silicon carbide, titanium carbide, zinc sulfide, and composites of at least two types thereof. Preferred examples include magnesium hydroxide, silica gel, aluminum hydroxide, glass, calcium carbonate, magnesium carbonate, calcium sulfate, and magnesium sulfate. Magnesium hydroxide, silica gel, and aluminum hydroxide are particularly preferable.

Examples of the organic powder include synthetic organic powders and natural polymer powders. Specific examples of the synthetic organic powder include acrylic resins, olefin resins such as polyethylene and polypropylene, polyethylene oxide, polypropylene oxide, polyethyleneimine, phenolic resins, styrene resins such as polystyrene, urethane resins such as polyurethane, divinylbenzene resins, fluorine resins, polyurea, polyester, polyamide, and polyimide. It is also possible to use a modified natural polymer such as carboxymethyl cellulose. Examples of the natural polymer include gelatin, starch, chitin, and chitosan. Among these, acrylic resins, olefin resins, phenolic resins, styrene resins, divinylbenzene resins, and fluorine resins can be used preferably.

The acrylic resin referred to here means a resin obtained by homopolymerization or copolymerization of (meth)acrylic acid, a (meth)acrylate ester, (meth)acrylamide, or (meth) acrylonitrile. The above-mentioned notation '(meth)acrylic acid' is ah abbreviation denoting that it can take either the methacrylic acid structure or the acrylic acid structure.

Examples of the (meth)acrylate ester include methyl(meth) acrylate, ethyl (meth)acrylate, butyl(meth)acrylate, lauryl (meth)acrylate, stearyl(meth)acrylate, 2-hydroxyethyl (meth)acrylate, 2-hydroxypropyl(meth)acrylate, 2-dimethylaminoethyl (meth)acrylate, and glycidyl(meth)acrylate.

As the acrylic resin, poly(methyl methacrylate) can be used preferably.

Examples of other acrylic resins include resins described in 'Kobunshi Daijiten' (Polymer Dictionary), Edited and translated by T. Mita, Maruzen Co., Ltd. (1994) pp. 6-12.

The olefin resin denotes a polymer of an olefin, and examples thereof include polyethylene, polypropylene, polyisobutylene, poly(1-butene), poly(1-pentene), poly(3-methyl-1-butene), poly(1-hexene), poly(3-methyl-1-pentene), poly(4-methyl-1-pentene), poly(1-heptene), poly(4-methyl-1-hexene), and poly(5-methyl-1-hexene). Polyethylene and polypropylene can be used preferably.

Examples of other olefin resins include resins described in 'Kobunshi Daijiten' (Polymer Dictionary), Edited and translated by T. Mita, Maruzen Co., Ltd. (1994) pp. 102-109.

The phenolic resin denotes a resin obtained by addition-condensation of a phenol and an aldehyde. When an acid catalyst is used in an addition-condensation reaction, a novolac type resin is obtained, and when a base catalyst is used, a resol type resin is obtained. Examples of the phenol include phenol, p-cresol, m-cresol, and resorcinol. Examples of the aldehyde include formaldehyde, salicylaldehyde, and s-trioxane.

Examples of other phenols and aldehydes include compounds described in 'Jikken Kagaku Koza' (Experimental Chemistry Series) 28 Polymer Synthesis 4th Edition (1992) pp. 427-430.

The styrene resin denotes a homopolymer or a copolymer of a styrene monomer. Examples of the styrene monomer include styrene, o-methylstyrene, m-methylstyrene, p-methylstyrene, divinylbenzene, α-methylstyrene, o-chlorostyrene, p-chlorostyrene, and chloromethylstyrene. Polystyrene can be used preferably.

Examples of the copolymer of a styrene monomer include copolymers described in 'Kobunshi Daijiten' (Polymer Dictionary), Edited and translated by T. Mita, Maruzen Co., Ltd. (1994) pp. 506-507.

The divinylbenzene resin denotes a homopolymer or a copolymer of a divinylbenzene monomer. Examples of the divinylbenzene monomer include divinylbenzene and chlorodivinylbenzene. Examples of a monomer that is copolymerized with the divinylbenzene monomer include the above-mentioned styrene monomers.

As the divinylbenzene resin, polydivinylbenzene can be used preferably.

The fluorine resin is a fluorine-containing polymer. Examples of the fluorine resin include polyvinyl fluoride, polyvinylidene fluoride, polytetrafluoroethylene, a tetrafluoroethylene-hexafluoropropylene copolymer, and a tetrafluoroethylene-perfluorovinyl ether copolymer. In particular, polytetrafluoroethylene can be used preferably.

The urethane resin denotes a polymer obtained by addition-polymerization of a polyfunctional isocyanate and a polyol. Examples of the polyfunctional isocyanate include toluene diisocyanate, diphenylmethane diisocyanate, naphthalene 1,5-diisocyanate, tolidine diisocyanate, hexamethylene diisocyanate, and isophorone diisocyanate. Examples of the polyol include a polyether polyol, a polyester polyol, and an aliphatic polyol.

Examples of other polyfunctional isocyanates and polyols include compounds described in, for example, the 'Poriuretan Handobukku' (Polyurethane Handbook), Ed. by K. Iwata, The Nikkan Kogyo Shimbun Ltd. (1987) pp. 77-81 and pp. 99-117.

The above-mentioned resins can be used singly or in a combination of two or more types.

The synthetic organic powder used in the present invention is preferably a fine powder having an average particle size of 20 μm or less, more preferably a fine powder having an average particle size of 0.1 to 10 μm, and yet more preferably a fine powder having an average particle size of 0.3 to 10 μm. When the average particle size is in the above-mentioned range, the surface gloss of the three-dimensional model obtained increases, which is preferable. The particle size distribution can be wide, but is preferably narrow. It is preferable for the particle size distribution to be nearly monodisperse, and the coefficient of variation of the particle size distribution is preferably 20% or less, and more preferably 15% or less. The shape of the synthetic organic powder can be any of amorphous, spherical, tabular, acicular, porous, etc. forms.

(Organic Copolymer Particles as Powder Material)

In the present invention, it is preferable to use organic copolymer particles comprising a copolymer of at least two types of monomers (hereinafter, also called 'monomer (a)' and 'monomer (b)').

The refractive index of a homopolymer of the monomer (a) is preferably 1.55 to 1.75, and the refractive index of a homopolymer of the monomer (b) is preferably 1.35 to less than 1.55.

The monomer (a) is preferably an ethylenically unsaturated aromatic compound in which an aromatic hydrocarbon is bonded to an ethylenically unsaturated group, more preferably a vinyl aromatic compound in which an aromatic hydrocarbon is bonded to a vinyl group, particularly preferably a substituted or unsubstituted styrene, and most preferably styrene.

Examples of the substituted or unsubstituted styrene include styrene, o-methylstyrene, m-methylstyrene, p-methylstyrene, divinylbenzene, α-methylstyrene, o-chlorostyrene, p-chlorostyrene, and chloromethylstyrene.

The monomer (b) is preferably an (meth)acrylate ester, more preferably a methacrylate ester, yet more preferably a methacrylate ester of a lower alcohol (1 to 4 carbons), and most preferably methyl methacrylate (MMA).

The combination of the monomer (a) and the monomer (b) is preferably a combination of substituted or unsubstituted styrene for the monomer (a) and a methacrylate ester of a lower alcohol (1 to 4 carbons) for the monomer (b), and more preferably a combination of styrene and methyl methacrylate.

Examples of the copolymer composition of the organic copolymer particles used in the present invention are listed below, but the present invention is not limited thereby.

Copolymer A: styrene/methyl methacrylate (molar ratio 75/25) copolymer

Copolymer B: styrene/methyl methacrylate (molar ratio 50/50) copolymer

Copolymer C: styrene/butyl methacrylate (molar ratio 50/50) copolymer

Copolymer D: α-methylstyrene/methyl methacrylate (molar ratio 50/50) copolymer

The organic copolymer particles used as the powder material have an average particle size of 0.1 to 1,000 μm, preferably 0.1 to 500 μm, more preferably 0.5 to 300 μm, and particularly preferably 0.8 to 50 μm. The average particle size referred to here means the volume-average particle size, and can be measured by, for example, a COULTER MULTISIZER manufactured by Beckman Coulter, Inc.

The refractive index $n_1$ of the organic copolymer is preferably in the range of 1.4 to 1.7.

The refractive index of a binder for bonding organic copolymer particles as the powder material is defined as $n_2$. When an ethylenically unsaturated monomer is used as the binder, the refractive index of the bonding agent formed by polymerization of this monomer is defined as $n_2$. The smaller the absolute value of $(n_1-n_2)$, the higher the transparency of the model obtained. When the absolute value of the difference between the refractive indexes is 0.1 or less, the transparency is high, and when it is 0.06 or less, a nearly transparent model can be obtained. The 'nearly transparent' referred to here means that the transmittance per cm of optical path is 50% or higher.

As the synthetic organic powder, powder particles obtained by grinding a bulk-polymerized actinic radiation-polymerizable compound, which is used as a binder, can be used. The polymerizable compound used as a binder is subjected to suspension polymerization or pearl polymerization, and a powder material having a desired particle size can be obtained. In this case, the refractive index of the powder material and the refractive index of the binder can be made equal.

Examples of the inorganic/organic composite powder include a composite of the above-mentioned organic powder and inorganic powder.

(Binder)

With regard to the binder used in the present invention, one that is cured by the application of actinic radiation is preferably used. This actinic radiation-curing binder has the properties of polymerizing and curing by polymerization or a crosslinking reaction upon exposure to actinic radiation. Since the binder does not react unless actinic radiation is applied externally, the viscosity is stable as long as it is not exposed to radiation.

The actinic radiation used in the present invention includes various types of radiation such as an electron beam (γ-rays), ultraviolet rays, X-rays, γ-rays, and α-rays.

A representative example of the actinic radiation-curing binder used in the present invention is a UV-curing binder.

The UV-curing binder comprises a photopolymerization initiator, a polymerizable compound, and a viscosity-adjusting additive, and substantially all of the constituent materials are cured by UV light, and have the function of bonding powder material.

With regard to the proportions of the constituent materials, the photopolymerization initiator is preferably 0.05 wt % to 10 wt %, and more preferably 0.1 wt % to 5 wt %, the polymerizable compound is preferably 20 wt % to 90 wt %, and more preferably 40 wt % to 80 wt %, and the viscosity-adjusting additive is preferably 0 wt % to 70 wt %, more preferably 0 wt % to 60 wt %, and particularly preferably is not added. The solution viscosity of the binder is preferably 1 to 30 mPa·s, and more preferably 2 to 20 mPa·s.

<Polymerizable Compound>

With regard to the polymerizable compound that can be used in the UV-curing binder, those for which addition-polymerization or ring-opening polymerization is started by a radical species, a cationic species, etc. formed from a photopolymerization initiator by irradiation with UV light and a polymer is formed are preferably used. With regard to the mode of polymerization of the addition-polymerization, there are radical, cationic, anionic, metathesis, and coordination polymerization. With regard to the mode of polymerization of the ring-opening polymerization, there are cationic, anionic, radical, metathesis, and coordination polymerization.

As an addition-polymerizable compound, a compound having at least one ethylenically unsaturated double bond can be cited. As the addition-polymerizable compound, a compound having at least one, and preferably two, terminal ethylenically unsaturated bonds can be used preferably. Such terminally ethylenically unsaturated compounds are widely known in the present industrial field. In the present invention, they can be used without particular restriction as long as the binder composition can be discharged stably from an inkjet nozzle.

The ethylenically unsaturated polymerizable compound is, in terms of its chemical configuration, a monofunctional polymerizable compound, a polyfunctional polymerizable compound (i.e., difunctional, trifunctional, or 4- to 6-functional), or a mixture thereof. Examples of the monofunctional polymerizable compound include unsaturated carboxylic acids (e.g., acrylic acid, methacrylic acid, itaconic acid, crotonic acid, isocrotonic acid, and maleic acid), esters thereof, and amides thereof. Examples of the polyfunctional polymerizable compound include esters of an unsaturated carboxylic acid and an aliphatic polyhydric alcohol compound and amides of an unsaturated carboxylic acid and an aliphatic polyhydric amine compound.

It is also possible to use an adduct between an unsaturated carboxylic acid ester or amide having a nucleophilic substituent such as a hydroxyl group, an amino group, or a mercapto group, and a monofunctional or polyfunctional isocyanate or epoxide; a dehydration-condensation product with a monofunctional or polyfunctional carboxylic acid; etc. It is also possible to use an adduct between an unsaturated carboxylic acid ester or amide having an electrophilic substituent such as an isocyanate group or an epoxy group and a monofunctional or polyfunctional alcohol, amine or thiol; or a substitution product between an unsaturated carboxylic acid ester or amide having a leaving group such as a halogen or a tosyloxy group and a monofunctional or polyfunctional alcohol, amine or thiol.

A representative example of the radically polymerizable compound that is an ester of an unsaturated carboxylic acid and a aliphatic polyhydric alcohol compound is a (meth) acrylate ester, and specific examples thereof include ethylene glycol di(meth)acrylate, triethylene glycol di(meth)acrylate, 1,3-butanediol di(meth)acrylate, tetramethylene glycol di(meth)acrylate, propylene glycol di(meth)acrylate, neopentyl glycol di(meth)acrylate, trimethylolpropane tri(meth) acrylate, trimethylolpropane tri((meth)acryloyloxypropyl) ether, trimethylolethane tri(meth)acrylate, hexanediol di(meth)acrylate, 1,4-cyclohexanediol di(meth)acrylate, tetraethylene glycol di(meth)acrylate, pentaerythritol di(meth) acrylate, pentaerythritol tri(meth)acrylate, pentaerythritol tetra(meth)acrylate, dipentaerythritol di(meth)acrylate, dipentaerythritol hexa(meth)acrylate, sorbitol tri(meth)acrylate, sorbitol tetra(meth)acrylate, sorbitol penta(meth)acrylate, sorbitol hexa(meth)acrylate, tri((meth)acryloyloxyethyl)isocyanurate, polyester (meth)acrylate oligomer, bis[p-(3-(meth)acryloxy-2-hydroxypropoxy)phenyl] dimethylmethane, and bis-[p-((meth)acryloxyethoxy) phenyl]dimethylmethane.

The above-mentioned notation '(meth)acrylate ester' is an abbreviation denoting that it can take either the methacrylate ester structure or the acrylate ester structure.

In addition to the (meth)acrylate ester, an itaconate ester, a crotonate ester, an isocrotonate ester, a maleate ester, etc. can also be used as the polymerizable compound.

Examples of the itaconate ester include ethylene glycol diitaconate, propylene glycol diitaconate, 1,3-butanediol diitaconate, 1,4-butanediol diitaconate, tetramethylene glycol diitaconate, pentaerythritol diitaconate, and sorbitol tetraitaconate.

Examples of the crotonate ester include ethylene glycol dicrotonate, tetramethylene glycol dicrotonate, pentaerythritol dicrotonate, and sorbitol tetracrotonate.

Examples of the isocrotonate ester include ethylene glycol diisocrotonate, pentaerythritol diisocrotonate, and sorbitol tetraisocrotonate.

Examples of the maleate ester include ethylene glycol dimaleate, triethylene glycol dimaleate, pentaerythritol dimaleate, and sorbitol tetramaleate.

Examples of other esters include aliphatic alcohol esters disclosed in, for example, JP-B46-27926, JP-B-5147334 (JP-B denotes a Japanese examined patent application publication), and JP-A-57-196231, those having an aromatic skeleton disclosed in JP-A-59-5240, JP-A-59-5241, and JP-A-2-226149, and those containing an amino group disclosed in JP-A-1-165613.

Specific examples of the amide monomer of an unsaturated carboxylic acid and an aliphatic polyhydric amine compound include methylenebisacrylamide, methylenebismethacrylamide, 1,6-hexamethylenebisacrylamide, 1,6-hexamethylenebismethacrylamide, diethylenetriaminetrisacrylamide, xylylenebisacrylamide, and xylylenebismethacrylamide.

Other preferred examples of amide monomers include those having a cyclohexylene structure disclosed in JP-B-54-21726.

Furthermore, an addition-polymerizable urethane compound produced by an addition reaction of an isocyanate and a hydroxyl group is also desirable, and specific examples thereof include a vinylurethane compound having at least two polymerizable vinyl groups per molecule, which is obtained by adding a hydroxyl group-containing vinyl monomer represented by Formula (I) below to a polyisocyanate compound having at least two isocyanate groups per molecule, such as that described in JP-B48-41708.

$CH_2=C(R^1)COOCH_2CH(R^2)OH$  Formula (I)

(Here, $R^1$ and $R^2$ denote H or $CH_3$.)

In the present invention, a cationic ring-opening polymerizable compound having at least one cyclic ether group per molecule such as an epoxy group and/or an oxetane group can be used, together with a UV cationic polymerization initiator, as the UV-curing binder.

A cationically polymerizable compound that can be used preferably in the present invention is generally explained below. As the cationically polymerizable compound, a curable compound containing a ring-opening polymerizable group can be cited; thereamong, a heterocyclic group-containing curable compound is preferable. Examples of such a curable compound include cyclic iminoethers and vinyl ethers such as epoxy derivatives, oxetane derivatives, tetrahydrofuran derivatives, cyclic lactone derivatives, cyclic carbonate derivatives, and oxazoline derivatives; in particular, epoxy derivatives, oxetane derivatives, and vinyl ethers are preferable.

Preferred examples of the epoxy derivative can be broadly divided into monofunctional glycidyl ethers, polyfunctional glycidyl ethers, monofunctional alicyclic epoxides, and polyfunctional alicyclic epoxides.

Examples of specific monofunctional and polyfunctional glycidyl ether compounds include diglycidyl ethers (e.g., ethylene glycol diglycidyl ether, bisphenol A diglycidyl ether), tri- or higher-functional glycidyl ethers (trimethylolethane triglycidyl ether, trimethylolpropane triglycidyl ether, glycerol triglycidyl ether, triglycidyl trishydroxyethyl isocyanurate, etc.), tetra- or higher-functional glycidyl ethers (sorbitol tetraglycidyl ether, pentaerythritol tetraglycidyl ether, a polyglycidyl ether of cresol novolac resin, a polyglycidyl ether of phenol novolac resin, etc.), alicyclic epoxides (Celloxide 2021P, Celloxide 2081, Epolead GT-301, Epolead GT-401 (all manufactured by Daicel Chemical Industries, Ltd.), EHPE (manufactured by Daicel Chemical Industries, Ltd.), polycyclohexyl epoxy methyl ether of phenol novolac resin, etc.), and oxetanes (OX-SQ, PNOX-1009 (all manufactured by Toagosei Co., Ltd.), etc.), but the present invention is not limited thereby.

In the present invention, an alicyclic epoxy derivative can be preferably used. The 'alicyclic epoxy group' referred to here means a partial structure that is formed by epoxidizing a double bond of a cycloalkene ring such as a cyclopentene group or a cyclohexene group using an appropriate oxidizing agent such as hydrogen peroxide or a peracid.

With regard to the alicyclic epoxy compound, polyfunctional alicyclic epoxides having at least two cyclohexene oxide groups or cyclopentene oxide groups per molecule are preferable. Specific examples of monofunctional or polyfunctional alicyclic epoxy compounds include 4-vinylcyclohexene dioxide, (3,4-epoxycyclohexyl)methyl-3,4-epoxycyclohexyl carboxylate, di(3,4-epoxycyclohexyl) adipate, di(3,4-epoxycyclohexylmethyl) adipate, bis(2,3-epoxycyclopentyl)ether, di(2,3-epoxy-6-methylcyclohexylmethyl) adipate, and dicyclopentadiene dioxide.

The alicyclic epoxy compound can be used singly or in a combination of two or more types.

Various types of alicyclic epoxy compounds are commercially available from Union Carbide Japan Ltd. (Dow Chemical Japan, Ltd.), Daicel Chemical Industries, Ltd., etc.

It is also possible to use a normal glycidyl compound having an epoxy group and having no alicyclic structure in the molecule singly or in combination with the above-mentioned alicyclic epoxy compound.

Examples of such a normal glycidyl compound include a glycidyl ether compound and a glycidyl ester compound, and it is preferable to use a glycidyl ether compound in combination.

Specific examples of the glycidyl ether compound include aromatic glycidyl ether compounds such as 1,3-bis(2,3-epoxypropyloxy)benzene, a bisphenol A epoxy resin, a bisphenol F epoxy resin, a phenol novolac epoxy resin, a cresol novolac epoxy resin, and a trisphenolmethane epoxy resin, and aliphatic glycidyl ether compounds such as 1,4-butanediol glycidyl ether, glycerol triglycidyl ether, propylene glycol diglycidyl ether, and trimethylolpropane triglycidyl ether. Examples of the glycidyl ester include the glycidyl ester of linolenic acid dimer.

The glycidyl ethers are commercially available from Yuka Shell Epoxy Co., Ltd. (Japan Epoxy Resin Co., Ltd.), etc.

In the present invention, it is possible to use a compound having an oxetanyl group, which is a 4-membered cyclic ether (hereinafter, also called simply an 'oxetane compound'). The oxetanyl group-containing compound is a compound having at least one oxetanyl group per molecule. These oxetanyl group-containing compounds can be broadly divided into monofunctional oxetane compounds having one oxetanyl group per molecule and polyfunctional oxetane compounds having at least two oxetanyl groups per molecule.

As the monofunctional oxetane compound, compounds represented by Formula (1) below are preferable.

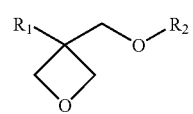

(1)

In Formula (1), $R_1$ denotes a methyl group or an ethyl group. $R_2$ denotes a hydrocarbon group having 6 to 12 carbons.

The hydrocarbon group denoted by $R_2$ can be a phenyl group or a benzyl group, is preferably an alkyl group having 6 to 8 carbons, and is particularly preferably a branched alkyl group such as 2-ethylhexyl. Examples of the oxetane compound in which $R_2$ is a phenyl group are described in JP-A-11-140279. Examples of the oxetane compound in which $R_2$ is a benzyl group, which can have a substituent, are described in JP-A-6-16804.

In the present invention, a polyfunctional oxetane compound can be used, and preferred compounds are those represented by Formula (2) below.

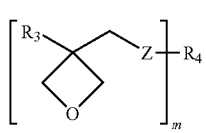

(2)

In Formula (2), m denotes a natural number of 2, 3, or 4, and Z denotes an oxygen atom, a sulfur atom, or a selenium atom. $R_3$ is a hydrogen atom, a fluorine atom, a straight-chain or branched alkyl group having 1 to 6 carbons, a fluoro alkyl or allyl group having 1 to 6 carbons, a phenyl group, or a furyl group. $R_4$ is an m-valent linking group, is preferably a group having 1 to 20 carbons, and can contain one or more oxygen or sulfur atoms.

Z is preferably an oxygen atom, $R_3$ is preferably an ethyl group, m is preferably 2, $R_4$ is preferably a linear or branched alkylene group having 1 to 16 carbons or a linear or branched poly(alkyleneoxy) group, and a compound having any two or more of the preferred $R_3$, $R_4$, Z, and m is more preferable.

As the UV-curing binder of the present invention, it is preferable to use a radically polymerizable ethylenically unsaturated compound and a cationically polymerizable cyclic ether (epoxy derivative and/or oxetane derivative) in combination. Since it has an interpenetrating polymer net (IPN) structure, there is the advantage that a bonded body having balanced physical properties can be obtained. In this case, as a photopolymerization initiator, a radical photopolymerization initiator and a cationic photopolymerization initiator (an onium salt, etc.) are preferably used in combination.

It is preferable that the volatile component content of the cured UV-curing binder is 5 wt % or less. Because of this, it is preferable to employ as the binder a solvent-free formulation containing no organic solvent.

In order to reduce the volatile component content after curing, the residual monomer may be post-polymerized, after a three-dimensional model is produced, by irradiation with UV light or by heating.

<Polymerizable Viscosity-Adjusting Compound>

As the polymerizable viscosity-adjusting compound, a compound having low viscosity and being capable of copolymerizing with a polymerizable compound is used. Examples thereof include an acrylate, a methacrylate, and an acrylamide. Specific examples thereof include tolyloxyethyl (meth)acrylate, phenyloxyethyl (meth)acrylate, cyclohexyl (meth)acrylate, ethyl(meth)acrylate, methyl (meth)acrylate, ethylene glycol di(meth)acrylate, divinylbenzene, methylenebisacrylamide, and 1,6-di(meth)acryloyloxyhexane. Tolyloxyethyl (meth)acrylate, ethylene glycol di(meth)acrylate, 1,6-di(meth)acryloyloxyhexane, etc. are preferable.

With regard to the ring-opening polymerizable cyclic ethers, although di- or higher-functional cyclic ethers are highly reactive, their viscosities are also high. A monofunctional cyclic ether can be used in combination in order to attain a low viscosity.

<Photopolymerization Initiator>

The curable binder used in the present invention can be cured by a thermal polymerization initiator, but is preferably cured by a photopolymerization initiator.

The photopolymerization initiator used in the present invention referred to here means a compound that generates active radical or cationic species by actinic radiation, and initiates and promotes a polymerization reaction of the binder. As the actinic radiation, radioactive radiation, γ-rays, α-rays, an electron beam, ultraviolet rays, etc. can be used. In particular, a method in which ultraviolet rays are used for curing is preferable.

The thermal polymerization initiator that can be used in the present invention can employ a known compound with a bond having small bond-dissociation energy. The thermal polymerization initiator can be used singly or in a combination of two or more types.

Examples of the thermal polymerization initiator include organic halogenated compounds, carbonyl compounds, organic peroxide compounds, azo polymerization initiators, azide compounds, metallocene compounds, hexaaryl biimidazole compounds, organic boric acid compounds, disulfonic acid compounds, and onium salt compounds.

Preferred examples of the polymerization initiator that generates radicals by the action of light include acetophenone compounds, benzoin compounds, benzophenone compounds, thioxanthone compounds, and benzil compounds. Examples of the acetophenone compounds include 2,2-diethoxyacetophenone, 2-hydroxymethyl-1-phenylpropan-1-one, 4'-isopropyl-2-hydroxy-2-methylpropiophenone, 2-hydroxy-2-methylpropiophenone, p-dimethylaminoacetone, p-tert-butyldichloroacetophenone, p-tert-butyltrichloroacetophenone, p-azidobenzalacetophenone, and 1-hydroxycyclohexyl phenyl ketone. Examples of the benzoin compounds include benzoin, benzoin methyl ether, benzoin ethyl ether, benzoin n-propyl ether, benzoin isopropyl ether, benzoin n-butyl ether, benzoin isobutyl ether, and benzil dimethyl ketal. Examples of the benzophenone compounds include benzophenone, methyl o-benzoylbenzoate, Michler's ketone, 4,4'-bisdiethylaminobenzophenone, and 4,4'-dichlorobenzophenone. Examples of the thioxanthone compounds include thioxanthone, 2-methylthioxanthone, 2-ethylthioxanthone, 2-isopropylthioxanthone, 4-isopropylthioxanthone, 2-chlorothioxanthone, and 2,4-diethylthioxanthone. Examples of the benzil compounds include benzil and benzil-β-methoxyethyl acetal.

As cited above, a sulfonium salt, an iodonium salt, etc., which are usually used as photo cation generators, can be used as radical generators by irradiation with ultraviolet rays, and they can therefore be used on their own in the present invention. Moreover, in order to increase the sensitivity, in addition to the polymerization initiator, a sensitizer can be used. Examples of the sensitizer include n-butylamine, triethylamine, tri-n-butylphosphine, and a thioxanthone derivative.

With regard to the photopolymerization initiator that generates active cationic species by ultraviolet rays, an onium salt initiator, for example, an aromatic sulfonium salt such as a triaryl sulfonium salt, or an aromatic iodonium salt such as a diaryl iodonium salt is useful, and a nonionic initiator such as a nitrobenzyl ester of a sulfonic acid can also be used. Furthermore, known photopolymerization initiators described in 'Imeijingu You Yukizairyo' (Organic Materials for Imaging), Ed. by The Japanese Research Association for Organic Electronics Materials, Bun-shin Publishing (1997) can be used.

(Colorant)

Colorants that can be used in the production process of the present invention can be broadly divided into dyes and pigments, and dyes can be used preferably.

(Dyes)

With regard to the dyes, those generally used in the field of printing technology (for example, printing inks, heat-sensitive inkjet recording, colorants for copying such as electrophotographic recording, and color proofing) can be used.

Examples thereof include dyes described in 'Senryo Binran' (Dye handbook) Ed. by The Society of Synthetic Organic Chemistry, Japan, Maruzen Co., Ltd. (1970), 'Kaisetsu Senryokagaku' (Explanation of Dye Chemistry), S. Abeta and K. Imada, Shyokusensha Co., Ltd. (1988), 'Shikiso Handobukku' (Colorant Handbook), Ed. by M. Ogawara, Kodansha Ltd. (1986), 'Inkujetto Purinta You Kemikarusu' (Inkjet Printer Chemicals-Survey of Materials Development Trends and Prospects), CMC Publishing Co., Ltd. (1997), 'Inkujetto Purinta' (Inkjet Printers-Technology and Materials), T. Amari, CMC Publishing Co., Ltd. (1998), etc.

Specific preferred examples of the dyes include azo dyes, metal-containing azo dyes, metal complex dyes, azomethine dyes, naphthol dyes, anthraquinone dyes, indigo dyes, carbonium dyes, quinoneimine dyes, xanthene dyes, cyanine dyes, quinoline dyes, nitro dyes, nitroso dyes, benzoquinone dyes, naphthoquinone dyes, fused polycyclic dyes (for example, phthalocyanine dyes, metal phthalocyanine dyes, perylene dyes, etc.), and nigrosine dyes.

These dyes can be used singly or in an appropriate combination.

With regard to the dyes, the use of subtractive primaries, that is, yellow (Y), magenta (M), and cyan (C), enables a wide range of hues to be reproduced at different saturations. In the present invention, it is preferable to use dyes that are used for photographic color prints. Details thereof are explained below.

Examples of the yellow dye include ketoimine type dyes obtained from couplers represented by Formulae (I) and (II) in U.S. Pat. Nos. 3,933,501, 4,022,620, 4,326,024, 4,401,752, and 4,248,961, JP-B-58-10739, GB Pat. Nos. 1,425,020 and 1,476,760, U.S. Pat. Nos. 3,973,968, 4,314,023, and 4,511, 649, and EP Pat. Nos. 249,473A, and 502,424A; couplers represented by Formulae (1) and (2) in EP Pat. No. 513,496A (in particular, Y-28 on page 18); couplers represented by Formula (I) of claim 1 in EP Pat. No. 568,037A; couplers represented by Formula (I) of lines 45 to 55 in Column 1 in U.S. Pat. No. 5,066,576; couplers represented by Formula (I) in Paragraph 0008 in JP-A4-274425; couplers of claim 1 on page 40 in EP Pat. No. 498,381A1 (in particular, D-35 on page 18); couplers represented by Formula (Y) on page 4 in EP Pat. No. 447,969A1 (in particular, Y-1 (page 17) and Y-54 (page 41)); and couplers represented by Formulae (II) to (IV) on lines 36 to 58 of Column 7 in U.S. Pat. No. 4,476,219 (in particular, 11-17 and 19 (Column 17), and 11-24 (Column 19)). Dyes described in JP-A-2001-294773, JP-A-2002-121414, JP-A-2002-105370, JP-A-2003-26974, and JP-A-2003-73598 are preferable; in particular, pyrazole compounds represented by Formula (Y-II) described in JP-A-2003-73598 are more preferably used, and Y-1 below can be cited as an example.

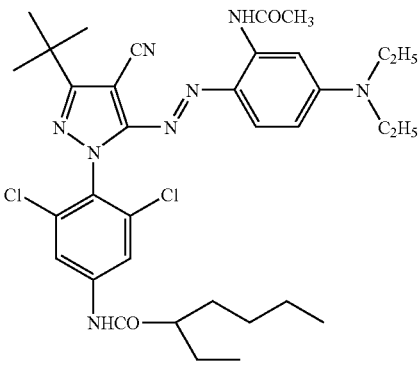

Y-1

Examples of the magenta dye include dyes described in JP-A-2001-181549, JP-A-2002-121414, JP-A-2002-105370, JP-A-2003-12981, and JP-A-2003-26974.

In particular, pyrazolotriazole azomethine compounds represented by Formula (III) described in JP-A-2002-121414 are preferable, and M-1 below can be cited as an example.

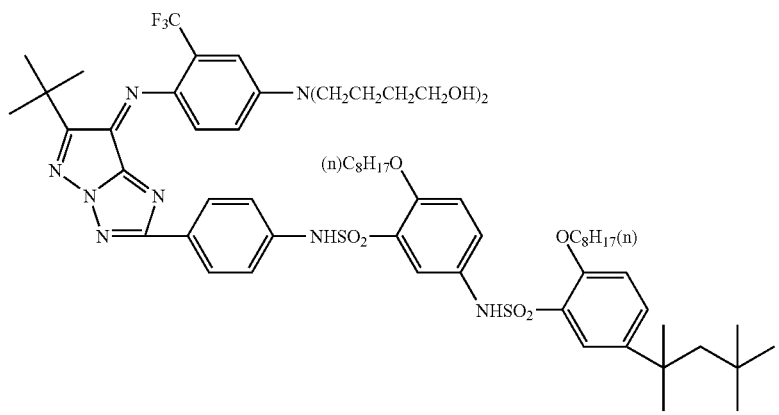

M-1

Examples of the cyan dye include dyes described in JP-A-2002-121414, JP-A-2002-105370, JP-A-2003-3109, and JP-A-2003-26974.

Pyrrolotriazole azomethine compounds represented by Formula (IV-1a) and phthalocyanine compounds represented by Formulae (C-II-1) and (C-II-2) described in JP-A-2002-121414 are preferably used, and C-1 and C-101 below can be cited as examples.

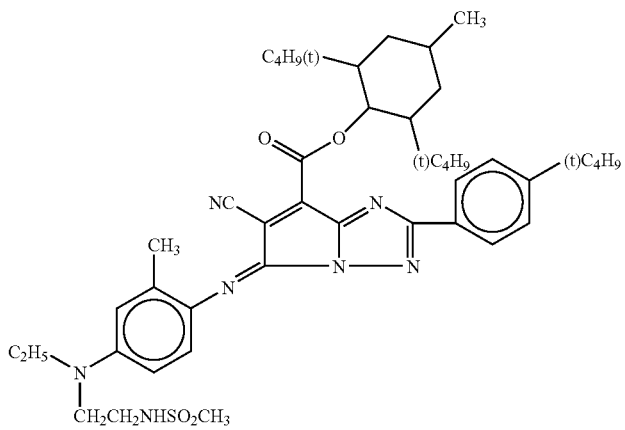

C-1

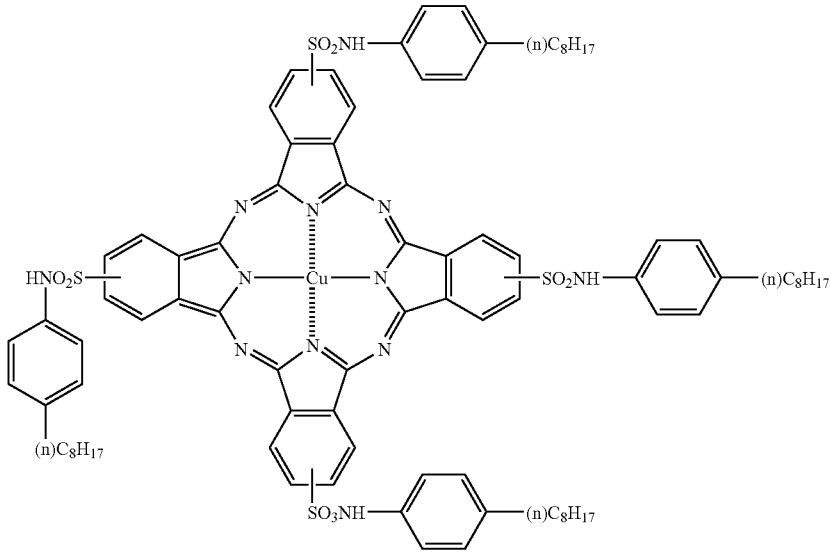

(C-101)

A black dye can be used as necessary in addition to the three CMY primaries. The black dye can be made by mixing the three CMY dyes.

(Pigment)

The pigment is not particularly limited, and it is possible to use any generally commercially available organic pigment or inorganic pigment, a dispersion of a pigment in an insoluble resin, etc. as a dispersion medium, a pigment on the surface of which a resin has been grafted, etc. It is also possible to use resin particles colored with a dye, etc.

In the present invention, in order to color the outer surface of a model, a color image is formed on the outline of a cross-sectional shape using the above-mentioned YMC binders, and a white reflection layer is preferably provided directly below this color image. The white reflection layer has a role corresponding to, for example, the background of a color print, and it is preferable to use a binder containing a white pigment (white binder) immediately inside the color image.

Specific examples of the white pigment that can be used include basic lead carbonate ($2PbCO_3Pb(OH)_2$, also known as silver white), zinc oxide (ZnO, also known as zinc white), titanium oxide ($TiO_2$, also known as titanium white), and strontium titanate ($SrTiO_3$, also known as titan strontium white).

Titanium oxide has, compared with other white pigments, a low specific gravity, a high refractive index, and is chemically and physically stable, and therefore has high hiding power and coloring power as a pigment and, furthermore, has excellent durability toward acids, alkalis, and other environments. It is therefore preferable to use titanium oxide as the white pigment. It is of course possible to use another white pigment (which can be any white pigment, in addition to the white pigments cited above) according to the type of powder material and binder component.

In the present invention, it is possible to use CMY pigments instead of the CMY dyes.

Specific examples of the organic pigment and the inorganic pigment include, as those exhibiting a yellow color, monoazo pigments such as CI Pigment Yellow 1 (Fast Yellow G, etc.) and CI Pigment Yellow 74, disazo pigments such as CI Pigment Yellow 12 (Disazo Yellow AM, etc.) and CI Pigment Yellow 17, benzidine-free azo pigments such as CI Pigment Yellow 180, azo lake pigments such as CI Pigment Yellow 100 (Tartrazine Yellow Lake, etc.), condensed azo pigments such as CI Pigment Yellow 95 (Azo Condensation Yellow GR, etc.), acidic dye lake pigments such as CI Pigment Yellow 115 (Quinoline Yellow Lake, etc.), basic dye lake pigments such as CI Pigment Yellow 18 (Thioflavine Lake, etc.), anthraquinone pigments such as Flavanthrone Yellow (Y-24), isoindolinone pigment such as Isoindolinone Yellow 3RLT (Y-110), quinophthalone pigments such as Quinophthalone Yellow (Y-138), isoindoline pigments such as Isoindoline Yellow (Y-139), nitroso pigments such as CI Pigment Yellow 153 (Nickel Nitroso Yellow, etc.), and metal complex azomethine pigments such as CI Pigment Yellow 117 (Copper Azomethine Yellow, etc.).

Examples of pigments exhibiting a magenta color include monoazo pigments such as CI Pigment Red 3 (Toluidine Red, etc.), disazo pigments such as CI Pigment Red 38 (Pyrazolone Red B, etc.), azo lake pigments such as CI Pigment Red 53:1 (Lake Red C, etc.) and CI Pigment Red 57:1 (Brilliant Carmine 6B), condensed azo pigments such as CI Pigment Red 144 (Azo Condensation Red BR, etc.), acidic dye lake pigments such as CI Pigment Red 174 (Phloxine B Lake, etc.), basic dye lake pigments such as CI pigment Red 81 (Rhodamine 6G' Lake, etc.), anthraquinone pigments such as CI Pigment Red 177 (Dianthraquinonyl Red, etc.), thioindigo pigments such as CI Pigment Red 88 (Thioindigo Bordeaux, etc.), perinone pigments such as CI Pigment Red 194 (Perinone Red, etc.), perylene pigments such as CI Pigment Red 149 (Perylene Scarlet, etc.), quinacridone pigments such as CI Pigment Red 122 (Quinacridone Magenta, etc.), isoindolinone pigments such as CI Pigment Red 180 (Isoindolinone Red 2BLT, etc.), and alizarin lake pigments such as CI Pigment Red 83 (Madder Lake, etc.).

Examples of pigments exhibiting a cyan color include disazo pigments such as CI Pigment Blue 25 (Dianisidine Blue, etc.), phthalocyanine pigments such as CI Pigment Blue 15 (Phthalocyanine Blue, etc.), acidic dye lake pigments such as CI Pigment Blue 24 (Peacock Blue Lake, etc.), basic dye lake pigments such as CI Pigment Blue 1 (Victoria Pure Blue BO Lake, etc.), anthraquinone pigments such as CI Pigment Blue 60 (Indanthrone Blue, etc.), and alkali blue pigments such as CI Pigment Blue 18 (Alkali Blue V-5:1).

(UV Exposure)

With regard to UV exposure for curing the UV-curing binder, a high-pressure mercury lamp, a low-pressure mercury lamp, a Deep UV lamp, a halogen lamp, etc., which are generally used, can be used, and the exposure wavelength is 450 to 250 nm, and preferably 400 to 300 nm. The exposure energy is preferably 500 mJ/cm$^2$ or less, and more preferably 10 to 400 mJ/cm$^2$. UV light can be guided from the UV light source to the surface of a powder material using a UV-transparent optical fiber.

By making the absolute value of the difference between the refractive index of the powder material and the refractive index of the binder that bonds together the powder material 0.1 or less, a transparent three-dimensional model having a smooth surface and excellent texture can be produced; furthermore, it is possible to carry out vivid coloring, and a high quality three-dimensional model, which had been thought to be impossible, can be prepared simply at low cost.

EXAMPLES

Materials used in Examples of the present invention are as follows.

DPHA (dipentaerythritol hexaacrylate; an in-house-synthesized product)

Trimethylolpropane trimethacrylate (TMPTMA manufactured by Daicel-UCB Co., Ltd.)

2-Hydroxy-2-methylpropiophenone (manufactured by Ciba Specialty Chemicals (Ciba S.C.))

1-Hydroxycyclohexyl phenyl ketone (manufactured by Ciba S.C.)

Tolyloxyethyl acrylate (manufactured by The Soken Chemical & Engineering Co., Ltd.)

Titanium oxide (KRONOS KA-15; particle size 0.4 μm, manufactured by Titan Kogyo Kabushiki Kaisha)

BDMA (1,3-butanediol dimethacrylate; an in-house-synthesized product)

Example 1

Preparation of UV-curing Binder 'Colorless Transparent Binder'

| | |
|---|---|
| Polymerizable compound: DPHA | 10 g |
| Photopolymerization initiator: 2-hydroxy-2-methylpropiophenone | 0.6 g |
| Polymerizable viscosity-adjusting compound: tolyloxyethyl acrylate | 10 g |

The above components were stirred and mixed to give a colorless transparent binder having a viscosity of about 15 mPa·s (giving a polymer having a refractive index of 1.54; the same applies below).

Preparation of UV-curing Binder 'White Binder'

| | |
|---|---|
| Polymerizable compound: DPHA | 10 g |
| Photopolymerization initiator: 2-hydroxy-2-methylpropiophenone | 0.6 g |
| Polymerizable viscosity-adjusting compound: tolyloxyethyl acrylate | 10 g |
| White pigment: titanium oxide | 3 g |

The above components were kneaded using a three roll mill to give a white binder having a viscosity of about 20 mPa·s.

Preparation of UV-curing Binder 'Yellow Binder'

| | |
|---|---|
| Polymerizable compound: DPHA | 10 g |
| Photopolymerization initiator: 1-hydroxycyclohexyl phenyl ketone | 0.5 g |
| Polymerizable viscosity-adjusting compound: tolyloxyethyl acrylate | 10 g |
| Colorant: Y-1 | 0.8 g |

The above Y-1, the M-1 below, and the C-1 below are as described in the 'Detailed Description of the Invention' section.

The above components were stirred and mixed to give a yellow binder (refractive index 1.54) having a viscosity of about 15 mPa·s.

Preparation of UV-curing Binder 'Magenta Binder'

| | |
|---|---|
| Polymerizable compound: DPHA | 10 g |
| Photopolymerization initiator: 1-hydroxycyclohexyl phenyl ketone | 0.5 g |
| Polymerizable viscosity-adjusting compound: tolyloxyethyl acrylate | 10 g |
| Colorant: M-1 | 0.8 g |

The above components were stirred and mixed to give a magenta binder (refractive index 1.54) having a viscosity of about 15 mPa·s.

Preparation of UV-curing Binder 'Cyan Binder'

| | |
|---|---|
| Polymerizable compound: DPHA | 10 g |
| Photopolymerization initiator: 1-hydroxycyclohexyl phenyl ketone | 0.5 g |
| Polymerizable viscosity-adjusting compound: tolyloxyethyl acrylate | 10 g |
| Colorant: C-1 | 0.8 g |

The above components were stirred and mixed to give a cyan binder (refractive index 1.54) having a viscosity of about 15 mPa·s.

Preparation of UV-curing Binder 'Black Binder'

| | |
|---|---|
| Polymerizable compound: DPHA | 10 g |
| Photopolymerization initiator: 1-hydroxycyclohexyl phenyl ketone | 0.5 g |
| Polymerizable viscosity-adjusting compound: tolyloxyethyl acrylate | 10 g |
| Colorants: | |
| Y-1 | 0.3 g |
| M-1 | 0.2 g |
| C-1 | 0.4 g |

The above components were stirred and mixed to give a black binder (refractive index 1.54) having a viscosity of about 15 mPa·s.

Preparation of Three-dimensional Model

As a powder material, polymethyl methacrylate (MB20X-5; average particle size 5 µm, refractive index 1.49, manufactured by Sekisui Plastics Co., Ltd.) was laid using a rod to give one powder material layer having a thickness of about 300 µm, and the above-mentioned colored binders (yellow, magenta, cyan, and black) and the colorless transparent binder were appropriately discharged via corresponding inkjet discharge nozzles according to the coloration data.

Liquid droplets were discharged by an inkjet system employing these UV-curing binders as inks at a resolution of 600 dpi (dot gap about 42 µm) so as to make dots form a continuous line while adjusting the amount of ink as necessary in portions where strength was required. Subsequently, a powder material layer having a thickness corresponding to 1 slice pitch was further formed, the binders were supplied so as to match the required cross-sectional shape, and by repeating this a three-dimensional model was prepared.

Evaluation Methods

A cubic model having a width, depth, and height of 3 cm prepared by the above-mentioned method was placed on a newspaper, and the extent to which characters could be identified was evaluated visually; this was defined as a transparency index.

The smoothness of the surface was subjected to a sensory evaluation by the feel when touching by hand; this was defined as a texture index.

Example 2

Polybutyl methacrylate (MB30X-8; average particle size 8 µm, refractive index 1.49, manufactured by Sekisui Plastics Co., Ltd.) was used as the powder material, and evaluation was carried out in the same manner as in Example 1.

Example 3

Polystyrene (SX-500H, average particle size 5 µm, refractive index 1.59, manufactured by The Soken Chemical & Engineering Co., Ltd.) was used as the powder material, and evaluation was carried out in the same manner as in Example 1.

Example 4

Polydivinylbenzene (SP-203; average particle size 3 µm, refractive index 1.57, manufactured by Sekisui Plastics Co., Ltd.) was used as the powder material, and evaluation was carried out in the same manner as in Example 1.

Example 5

Magnesium hydroxide (KISUMA 5Q; average particle size 0.83 µm, refractive index 1.54, manufactured by Kyowa Chemical Industry Co., Ltd.) was used as the powder material, and evaluation was carried out in the same manner as in Example 1.

Example 6

Aluminum hydroxide (HIGILITE H-42M; average particle size 1.0 µm, refractive index 1.52, manufactured by Showa Keikinzoku K.K.) was used as the powder material, and evaluation was carried out in the same manner as in Example 1.

Example 7

The procedure of Example 1 was repeated except that a white binder was used instead of the colorless transparent binder, and a three-dimensional model (Example 7) having a width, depth, and height of 3 cm was prepared.

The above results are summarized in Table 1 below.

TABLE 1

| No. | Powder material | Transparency | Texture |
|---|---|---|---|
| Example 1 | Polymethyl methacrylate | Good | Good |
| Example 2 | Polybutyl methacrylate | Good | Good |
| Example 3 | Polystyrene | Good | Good |
| Example 4 | Polydivinylbenzene | Good | Good |
| Example 5 | Magnesium hydroxide | Good | Good |
| Example 6 | Aluminum hydroxide | Good | Good |
| Example 7 | Polymethyl methacrylate | Poor | Good |

A sensory evaluation of the texture was carried out, and the transparency and the texture were categorized using the following rankings.

Transparency
Good . . . Almost transparent
Poor . . . Opaque

Texture
Good . . . Good
Fair . . . Fairly good
Poor . . . Inadequate

Example 8

Preparation of UV-curing Binder 'Colorless Transparent Binder'

| | |
|---|---|
| Polymerizable compound: BDMA | 10 g |
| Photopolymerization initiator: 2-hydroxy-2-methylpropiophenone | 0.6 g |
| Polymerizable viscosity-adjusting compound: tolyloxyethyl acrylate | 10 g |

The above components were stirred and mixed to give a colorless transparent binder (refractive index 1.51) having a viscosity of about 3 mPa·s.

In the same manner as in Example 1, a white binder, a yellow binder, a magenta binder, a cyan binder, and a black binder, which are UV-curing binders, were prepared.

Preparation of Three-dimensional Model

As the organic powder material, polystyrene (SX-500H; average particle size 5 μm, refractive index 1.59, manufactured by The Soken Chemical & Engineering Co., Ltd.) was laid using a rod to give one organic powder material layer having a thickness of about 100 μm, and the above-mentioned yellow binder, magenta binder, cyan binder, black binder, and colorless transparent binder were appropriately discharged via corresponding inkjet discharge nozzles according to the coloration data.

Liquid droplets were discharged by an inkjet system employing these UV-curing binders as inks at a resolution of 600 dpi (dot gap about 42 μm) so as to make dots form a continuous line while adjusting the amount of ink as necessary in portions where strength was required. Subsequently, a powder material layer having a thickness corresponding to 1 slice pitch was further formed, the binders were supplied so as to match the required cross-sectional shape, and by repeating this a three-dimensional model was prepared.

Example 9

Polydivinylbenzene (SP-203; average particle size 3 μm, refractive index 1.57, manufactured by Sekisui Chemical Co., Ltd.) was used as the organic powder material, and evaluation was carried in the same manner as in Example 8.

Example 10

Polyethylene (FLO-BEADS LE-1080; average particle size 6 μm, refractive index 1.51, manufactured by Sumitomo Seika Chemicals Co., Ltd.) was used as the organic powder material, and evaluation was carried in the same manner as in Example 8.

Example 11

A phenolic resin (Bellpearl R-600, refractive index 1.56, manufactured by Kanebo Ltd.) was used as the organic powder material, and evaluation was carried in the same manner as in Example 8.

Example 12

A urethane resin (Dynamic Beads; average particle size 6 μm, refractive index 1.55, manufactured by Dainichiseika Color & Chemicals Mfg. Co., Ltd.) was used as the organic powder material, and evaluation was carried in the same manner as in Example 8.

Example 13

The procedure of Example 8 was repeated except that a white binder was used instead of the colorless transparent binder, and a three-dimensional model (Example 13) having a thickness of 3 cm was prepared.

Comparative Example 1

Corn starch (average particle size 15 μm, refractive index 1.589, manufactured by Nihon Shokuhin Kako Co., Ltd.) was used as the powder material, and evaluation was carried in the same manner as in Example 8.

Comparative Example 2

Wheat starch (average particle size 10 μm, refractive index 1.589, manufactured by Shin-shin Foods Co., Ltd.) was used as the powder material, and evaluation was carried in the same manner as in Example 8.

Evaluation Methods

A sensory evaluation of the smoothness of the surface of the three-dimensional model obtained was carried out visually and by the feel when touching by hand; this was defined as a texture index.

A sensory evaluation of the texture was carried out, and the transparency and the texture were categorized using the following rankings.

Good . . . Good
Fair . . . Fairly good
Poor . . . Inadequate

The above results are summarized in Table 2 below.

TABLE 2

| No. | Powder material | Transparency | Texture |
|---|---|---|---|
| Example 8 | Polystyrene | Good | Good |
| Example 9 | Polydivinylbenzene | Good | Good |
| Example 10 | Polyethylene | Good | Good |
| Example 11 | Phenolic resin | Good | Good |
| Example 12 | Urethane resin | Good | Good |
| Example 13 | Polystyrene | Poor | Good |
| Comp. Ex. 1 | Corn starch | Poor | Poor |
| Comp. Ex. 2 | Wheat starch | Poor | Poor |

Example 14

Preparation of UV-curing Binder 'Colorless Transparent Binder'

| | |
|---|---|
| Polymerizable compound: DPHA | 2.5 g |
| Polymerizable compound: trimethylolpropane trimethacrylate | 17.5 g |
| Photopolymerization initiator: 2-hydroxy-2-methylpropiophenone | 0.6 g |

The above components were stirred and mixed to give a colorless transparent binder.

Preparation of UV-curing Binder 'White Binder'

| | |
|---|---|
| Polymerizable compound: DPHA | 2.5 g |
| Polymerizable compound: trimethylolpropane trimethacrylate | 17.5 g |
| Photopolymerization initiator: 2-hydroxy-2-methylpropiophenone | 0.6 g |
| White pigment: titanium oxide | 3 g |

The above components were kneaded using a three roll mill to give a white binder.

Preparation of UV-curing Binder 'Yellow Binder'

| | |
|---|---|
| Polymerizable compound: DPHA | 2.5 g |
| Polymerizable compound: trimethylolpropane trimethacrylate | 17.5 g |
| Photopolymerization initiator: 2-hydroxy-2-methylpropiophenone | 0.6 g |
| Colorant: Y-1 | 0.8 g |

The above Y-1, the M-1 below, and the C-1 below are as described in the 'Detailed Description of the Invention' section.

The above components were stirred and mixed to give a yellow binder.

Preparation of UV-curing Binder 'Magenta Binder'

| | |
|---|---|
| Polymerizable compound: DPHA | 2.5 g |
| Polymerizable compound: trimethylolpropane trimethacrylate | 17.5 g |
| Photopolymerization initiator: 2-hydroxy-2-methylpropiophenone | 0.6 g |
| Colorant: M-1 | 0.8 g |

The above components were stirred and mixed to give a magenta binder.

Preparation of UV-curing Binder 'Cyan Binder'

| | |
|---|---|
| Polymerizable compound: DPHA | 10 g |
| Photopolymerization initiator: 1-hydroxycyclohexyl phenyl ketone | 0.5 g |
| Polymerizable viscosity-adjusting compound: tolyloxyethyl acrylate | 10 g |
| Colorant: C-1 | 0.8 g |

The above components were stirred and mixed to give a cyan binder.

Preparation of UV-curing Binder 'Black Binder'

| | |
|---|---|
| Polymerizable compound: DPHA | 2.5 g |
| Polymerizable compound: trimethylolpropane trimethacrylate | 17.5 g |
| Photopolymerization initiator: 2-hydroxy-2-methylpropiophenone | 0.6 g |
| Colorants: | |
| Y-1 | 0.3 g |
| M-1 | 0.2 g |
| C-1 | 0.4 g |

The above components were stirred and mixed to give a black binder.

Preparation of Three-dimensional Model

As the organic copolymer powder material, the Copolymer A of methyl methacrylate and styrene (refractive index 1.515, methyl methacrylate/styrene=25/75 (molar ratio), average particle size 12 μm) was laid using a rod to give one organic copolymer powder material layer having a thickness of about 100 μm, and the above-mentioned yellow binder, magenta binder, cyan binder, black binder, white binder, and colorless transparent binder were appropriately discharged via corresponding inkjet discharge nozzles according to the coloration data.

Liquid droplets were discharged by an inkjet system employing these UV-curing binders as inks at a resolution of 600 dpi (dot gap about 42 μm) so as to make dots form a continuous line while adjusting the amount of ink as necessary in portions where strength was required. Subsequently, an organic copolymer powder material layer having a thickness corresponding to 1 slice pitch was further formed, the binders were supplied so as to match the required cross-sectional shape, and by repeating this a three-dimensional model was prepared.

Example 15

The procedure of Example 14 was repeated except that

| | |
|---|---|
| polymerizable compound: DPHA | 10 g and |
| polymerizable compound: tolyloxyethyl acrylate | 10 g |
| were used instead of | |
| polymerizable compound: DPHA | 2.5 g and |
| polymerizable compound: trimethylolpropane trimethacrylate | 17.5 g, | and as the powder material the Copolymer B of methyl methacrylate and styrene (refractive index 1.540, methyl methacrylate/styrene=50/50 (molar ratio), average particle size 5 μm) was used instead of the Copolymer A of methyl methacrylate and styrene (refractive index 1.515, methyl methacrylate/styrene=25175 (molar ratio), average particle size 12 μm), and a three-dimensional model was prepared.

The average particle size of the powder material was measured using a COULTER MULTISIZER manufactured by Beckman Coulter, Inc. under conditions of a pore diameter of 100 μm.

Evaluation Method

The transparency of a transparent part of each of the three-dimensional models (thickness 3 mm) prepared in Examples 14 and 15 was evaluated using the total light transmittance obtained by a haze meter (Model HGM-2DP, manufactured by Suga Test Instruments Co., Ltd.).

The above results are summarized in Table 3 below.

TABLE 3

| No. | Powder material | Binder refractive index | Powder material refractive index | Total light transmittance (%) |
|---|---|---|---|---|
| Example 14 | Methyl methacrylate/Styrene Copolymer A | 1.515 | 1.515 | 83 |
| Example 15 | Methyl methacrylate/Styrene Copolymer B | 1.540 | 1.540 | 80 |

What is claimed is:

1. A process for producing a three-dimensional model, the process comprising:
   (a) a layer formation step of forming a layer of a synthetic organic powder material having a refractive index $n_1$ above a support, wherein the synthetic organic powder material comprises organic copolymer particles that are derived from at least two types of monomers, and wherein the organic copolymer particles comprise a copolymer of an aromatic vinyl compound and a (meth)acrylate ester;
   (b) a shape formation step of bonding the powder material layer into a predetermined shape by a binder that gives a refractive index $n_2$, wherein a region to which the binder has been applied is cured by exposure to UV rays from UV irradiation; and
   (c) sequentially repeating the above steps;
   the absolute value of the difference between the refractive index $n_1$ of the powder material and the refractive index $n_2$ given by the binder being 0.1 or less, and
   the binder comprising two or more types of binders selected from the group consisting of at least one type of colored binder, a white binder, and a colorless transparent binder, wherein each of the colored binder, the white binder, and the colorless binder includes UV-curing compound,
   the two types of monomers being a monomer (a) and a monomer (b), a homopolymer of the monomer (a) having a refractive index of 1.55 to 1.75, and a homopolymer of the monomer (b) having a refractive index of 1.35 to less than 1.55,
   monomer (a) being the aromatic vinyl compound and monomer (b) being the (meth)acrylate ester, and
   the binder comprising a (meth)acrylate ester of an aliphatic polyhydric alcohol.

2. The process for producing a three-dimensional model according to claim 1, wherein the colored binder comprises at least a yellow binder, a magenta binder, and a cyan binder.

3. The process for producing a three-dimensional model according to claim 1, wherein the colored binder comprises at least a yellow binder, a magenta binder, a cyan binder, and a black binder.

4. The process for producing a three-dimensional model according to claim 1, wherein the organic copolymer particles have an average particle size of 0.8 to 50 μm.

5. The process for producing a three dimensional model according to claim 1, wherein the aromatic vinyl compound is a substituted or unsubstituted styrene.

6. The process for producing a three dimensional model according to claim 1, wherein the (meth)acrylate ester is a methacrylate ester of a lower alcohol having 1 to 4 carbons.

7. The process for producing a three dimensional model according to claim 1, wherein the refractive index $n_1$ of the organic copolymer is in the range of 1.4 to 1.7.

8. The process for producing a three dimensional model according to claim 1, wherein the binder comprises a polymerizable compound having at least one ethylenically unsaturated bond.

* * * * *